United States Patent [19]
Hogan et al.

[11] 3,793,675
[45] Feb. 26, 1974

[54] FISH-CONVEYING MECHANISM

[75] Inventors: Elmer R. Hogan, Bellevue; John I. Simpson, Seattle, both of Wash.

[73] Assignee: Smith-Berger Manufacturing Corporation, Seattle, Wash.

[22] Filed: Mar. 27, 1972

[21] Appl. No.: 238,271

Related U.S. Application Data
[62] Division of Ser. No. 19,162, March 13, 1970, Pat. No. 3,670,363.

[52] U.S. Cl. ................................................. 17/59
[51] Int. Cl. ............................................ A22c 25/14
[58] Field of Search ......... 17/59, 64, 63, 52, 53, 55, 17/59, 63

[56] References Cited
UNITED STATES PATENTS
2,166,939  7/1939  Christensen ........................... 17/59

*Primary Examiner*—Robert Peshock
*Attorney, Agent, or Firm*—Robert W. Beach

[57] ABSTRACT

Fish-beheading mechanism and fish-cleaning mechanism are driven by a common drive means, including a jaw clutch engageable in different positions to alter the timed relationship between the fish-beheading mechanism and the fish-cleaning mechanism. A tail-receiver lifted by a cam wheel rotating about a horizontal axis transfers the fish from the feed table of the fish-beheading mechanism to tail-impaling pins of the fish-cleaning bull ring. In a common drive for the bull ring and the beheading table an automatic satellite gear train throw-out will disengage a holding lever to disconnect the drive for the means feeding the cleaning mechanism if such feeding means becomes overloaded.

9 Claims, 13 Drawing Figures

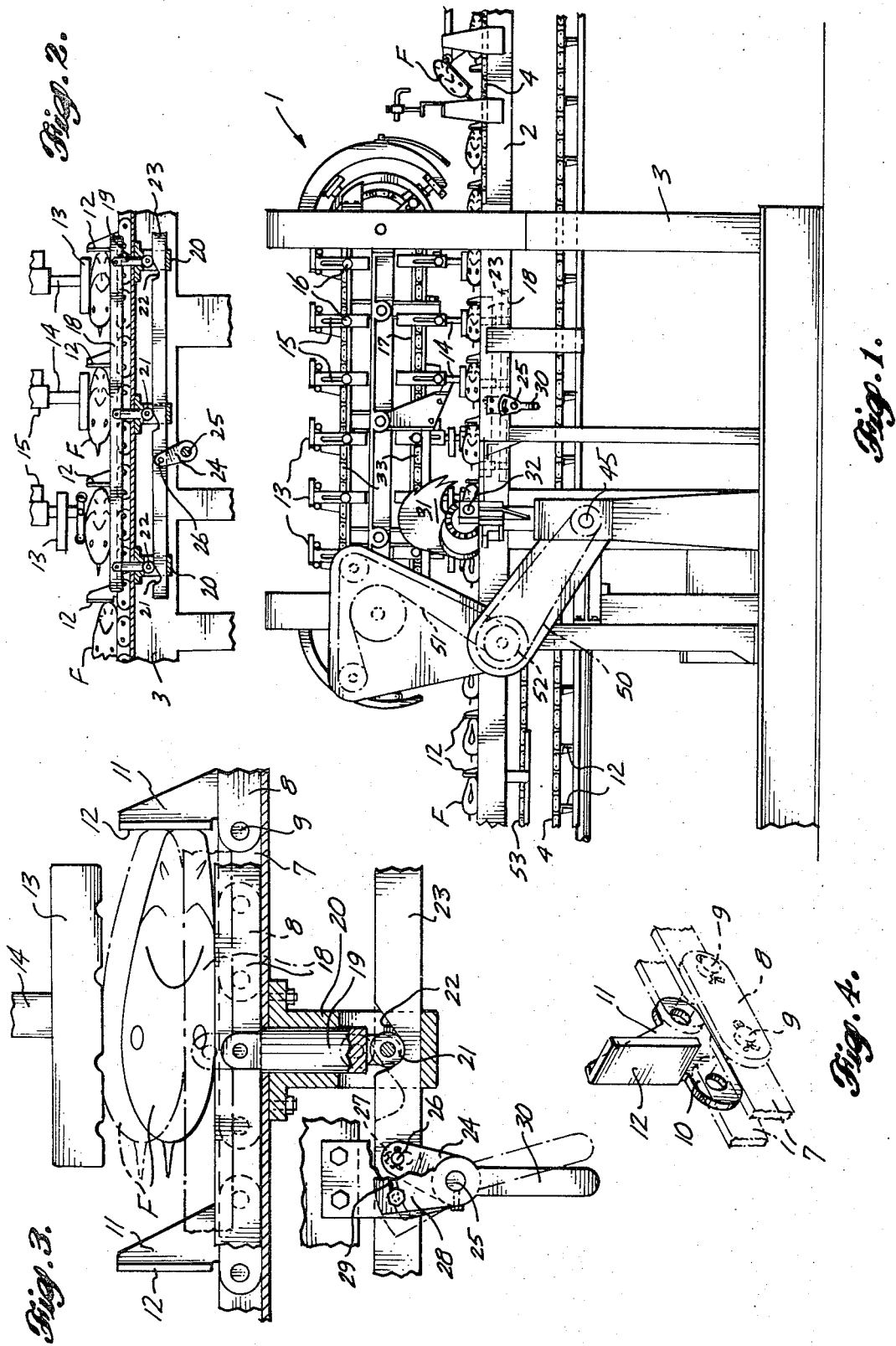

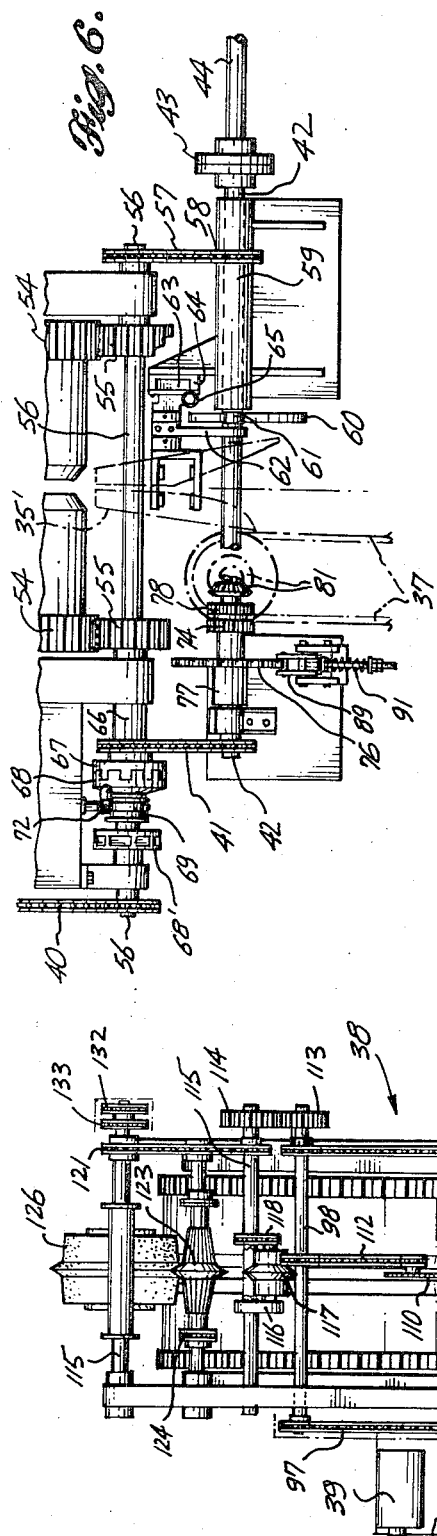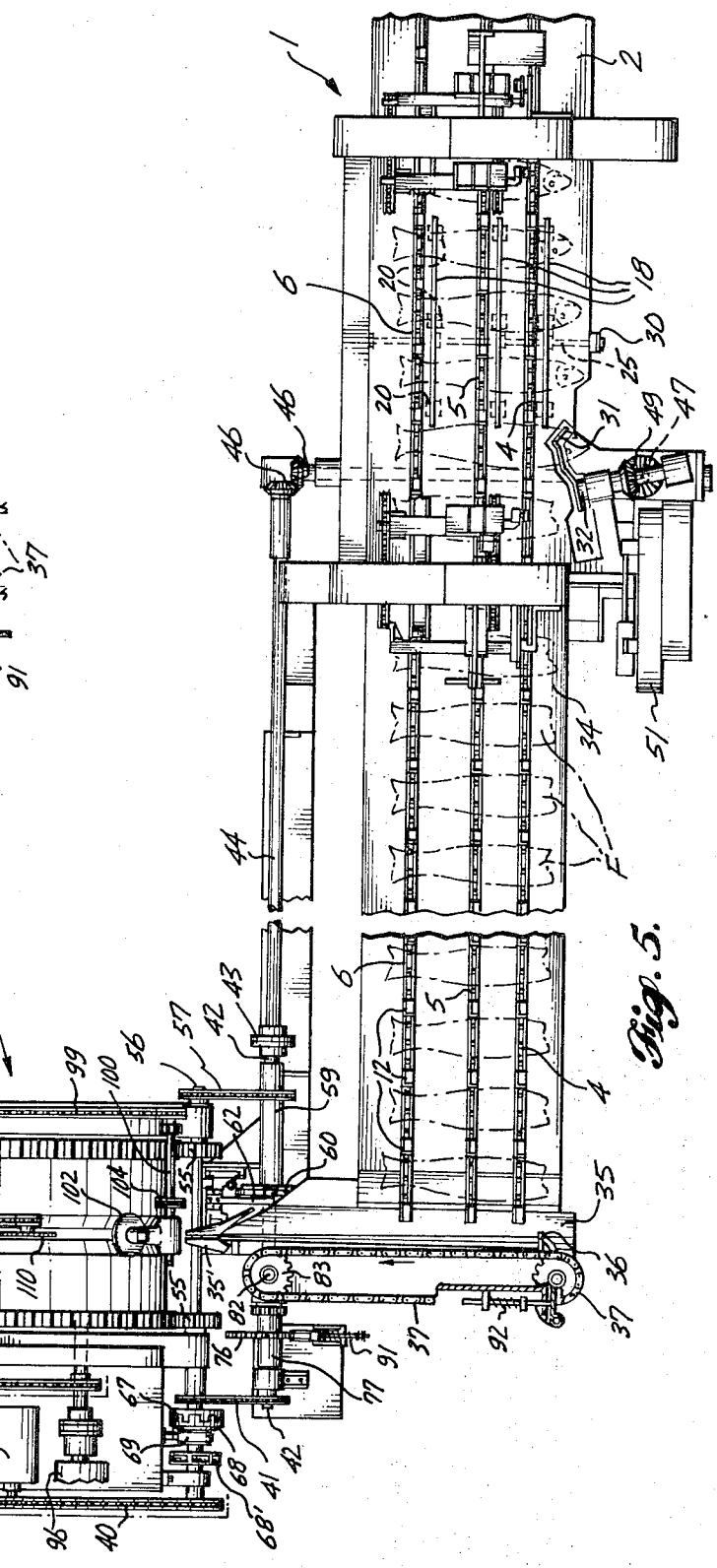

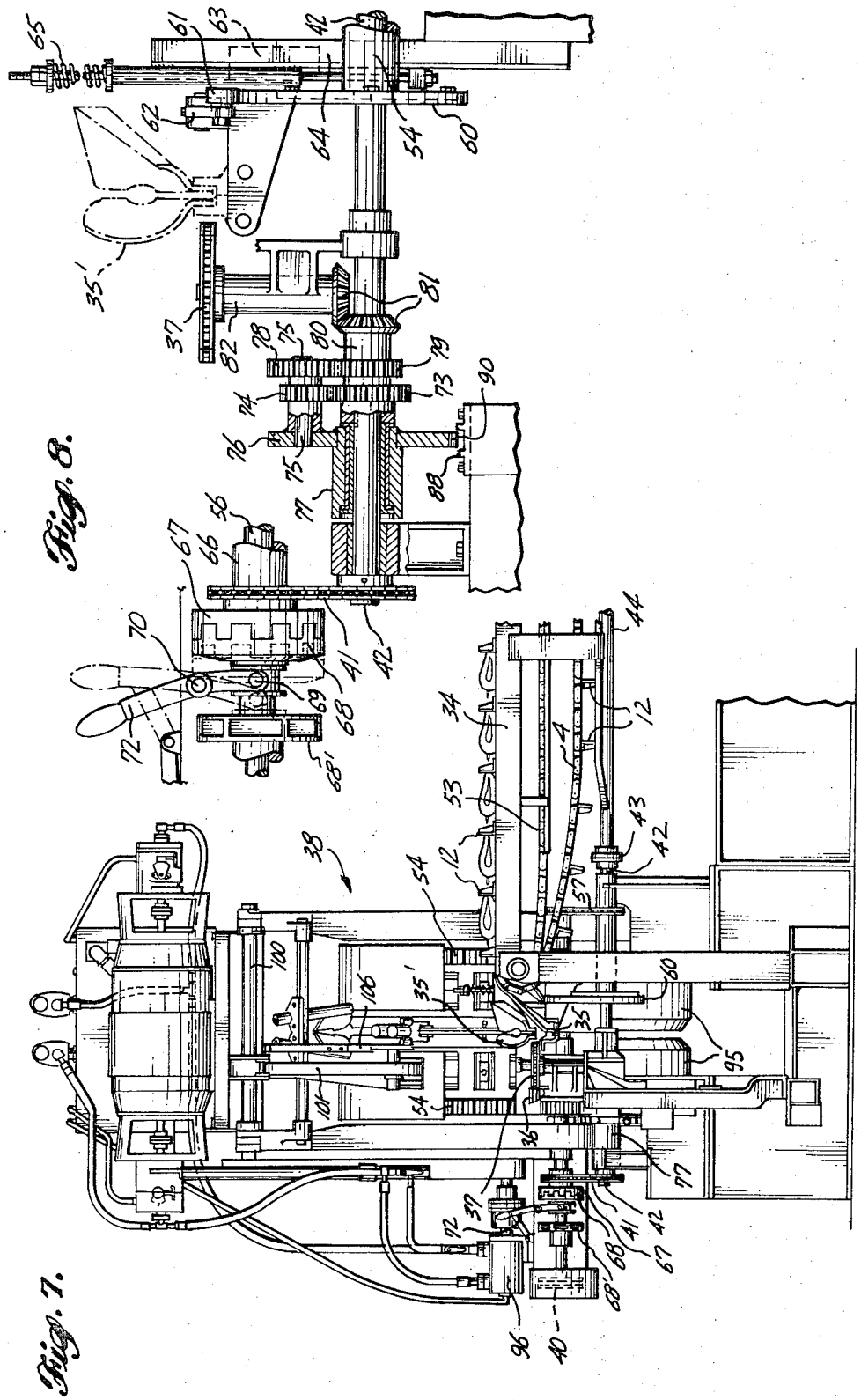

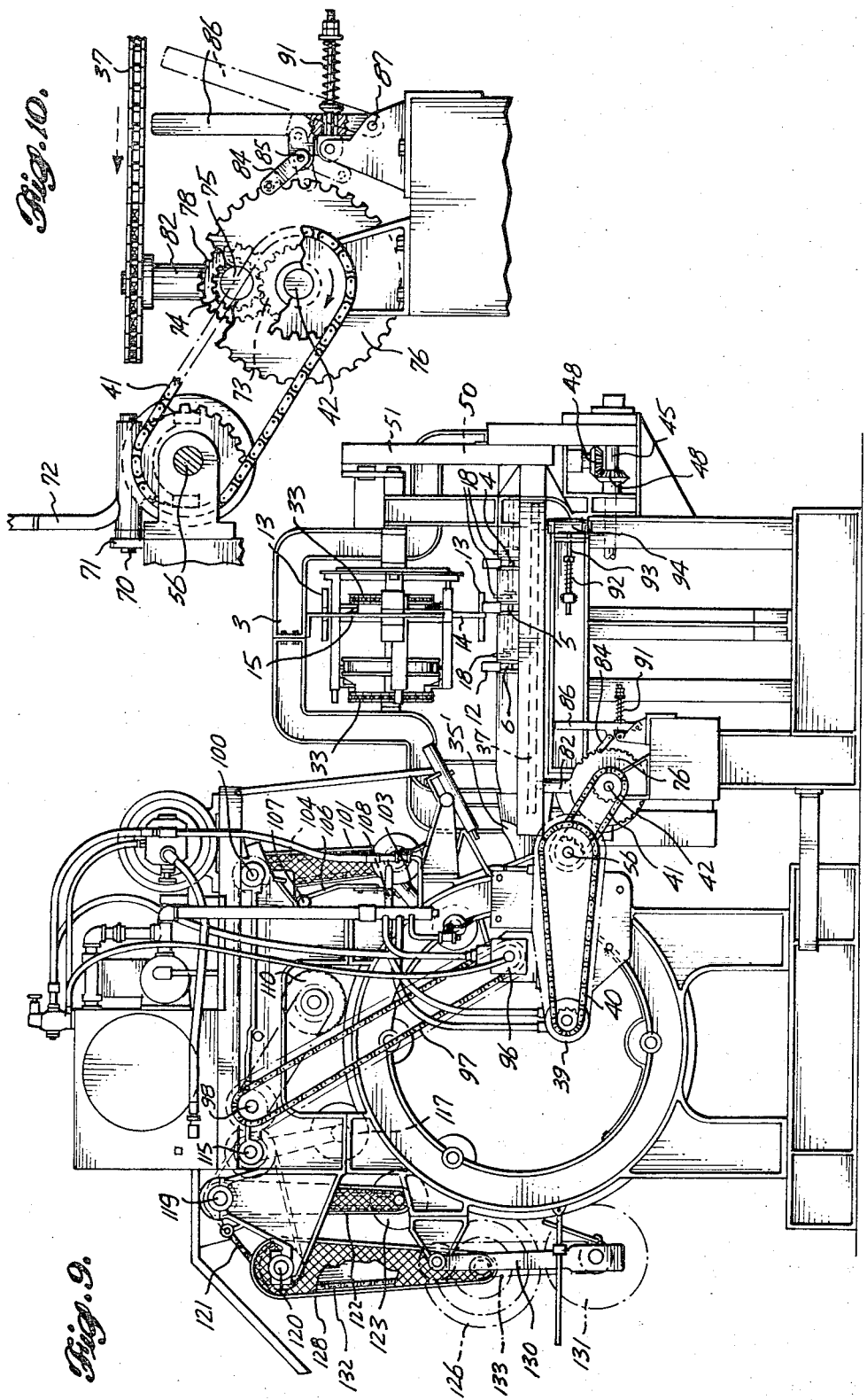

FISH-CONVEYING MECHANISM

This application is a division of our U.S. Pat. application Ser. No. 19,162, filed Mar. 13, 1970, for Fish-Beheading and Cleaning Apparatus, resulting in U.S. Pat. No. 3,670,363. The fish-beheading and cleaning apparatus of the present invention relates to three principal components, namely fish-beheading mechanism, fish-cleaning mechanism, and transfer mechanism for transferring fish from the beheading mechanism to the cleaning mechanism. Beheading mechanism of generally similar type is disclosed in U. S. Pat. Nos. 2,625,706 and 2,725,708. Fish-cleaning mechanism of a type generally similar to that incorporated in the present apparatus is disclosed in U. S. Pat. Nos. 1,542,196 and 3,456,287. Transfer mechanism for transferring fish from such beheading mechanism to such cleaning mechanism is disclosed generally in U. S. Pat. Nos. 2,585,267; 2,630,208 and 2,680,876.

An object of the present invention is to provide improved mechanism for transferring fish from the beheading mechanism to the cleaning mechanism which includes a drive chain having an improved chain tightener, means for disconnecting the drive from the means feeding the cleaning mechanism in case such feeding means should become overloaded, and a simplified drive for the means for transferring fish from the bleeding mechanism to the cleaning mechanism.

FIG. 1 is a side elevation of the beheading mechanism, and

FIG. 2 is an enlarged illustration of a portion of such mechanism.

FIG. 3 is a vertical section through a portion of the beheading mechanism on a still larger scale.

FIG. 4 is a top perspective of a component part of the beheading mechanism.

FIG. 5 is a plan of the fish-beheading and cleaning apparatus with parts broken away, and FIG. 6 is a plan of a portion of the drive mechanism on an enlarged scale.

FIG. 7 is an elevation showing a portion of the beheading mechanism and an end of the fish-cleaning mechanism, parts being broken away.

FIG. 8 is an elevation on an enlarged scale of a portion of the drive mechanism shown in FIG. 7, with parts broken away.

FIG. 9 is an elevation of the apparatus showing a side of the cleaning mechanism and an end of the fish-beheading mechanism.

FIG. 10 is a fragmentary elevation of a portion of the drive mechanism shown in FIG. 9 on an enlarged scale, having parts broken away.

Figure 11:
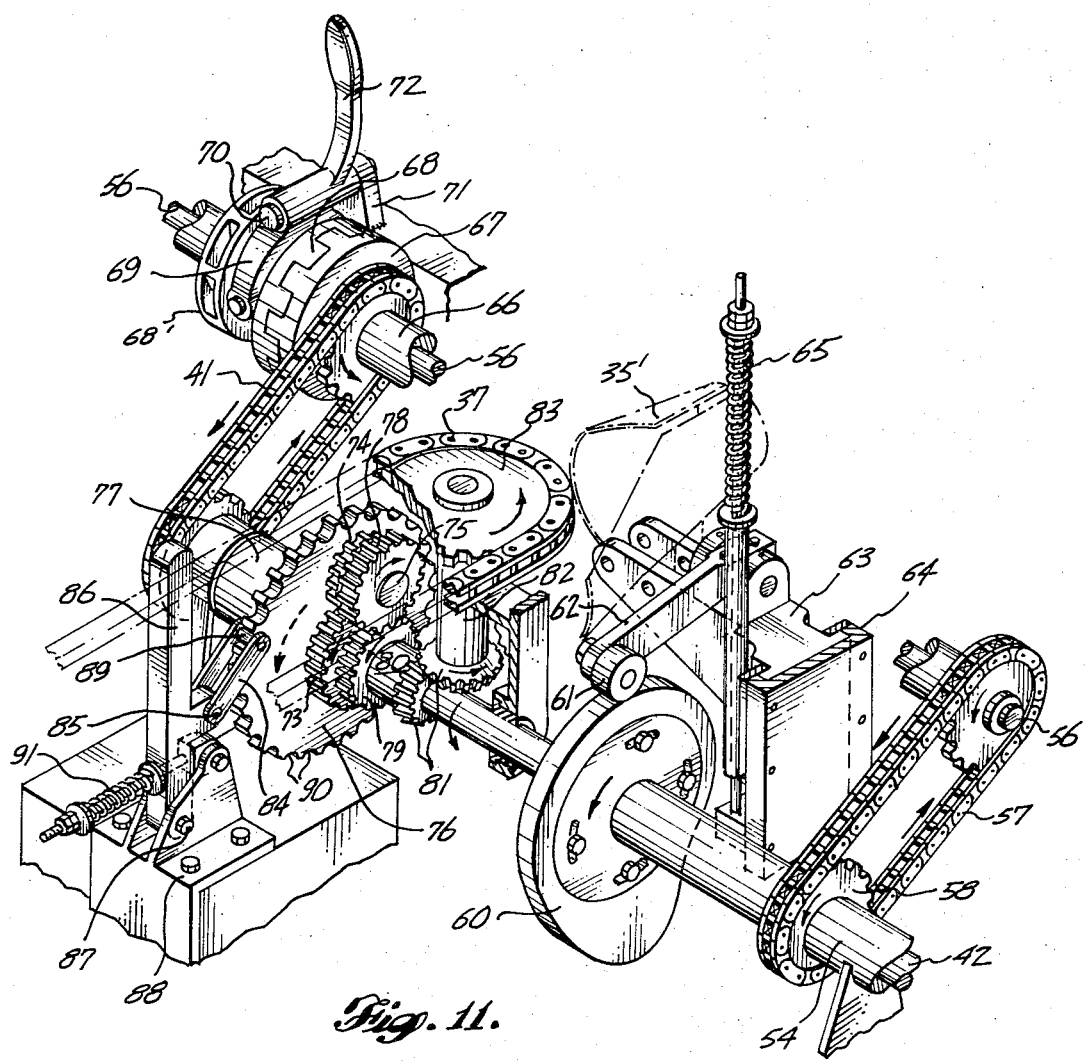
FIG. 11 is a top perspective of such drive mechanism.

The apparatus of the present invention is particularly well suited to the beheading and cleaning of fish of moderate size, especially salmon. Even salmon, however, vary in size to a considerable extent, although in a particular run the fish are inclined to be of fairly uniform size. Provision is made for adjusting the apparatus generally to handle a run of larger fish or to handle a run of smaller fish. The feeding means for the fish-cleaning mechanism can be adjusted to accommodate fish of more than two average sizes.

The beheading mechanism 1 includes a feed table 2 carried by a frame 3 for supplying round fish to be beheaded. Such fish F are carried along the table in a direction transversely of their lengths from right to left, as seen in FIGS. 1 and 5, by a plurality of parallel endless conveyor chains 4, 5 and 6, driven in unison. These chains are of the roller chain type, as shown best in FIGS. 3 and 4, including the blocks 7 and side links 8 held together by pins 9.

Simple, inexpensive and effective flights may be provided for such chains by fabricating from plate material components substituted at spaced locations along the length of each chain for individual side links 8. The detailed construction of such flights is shown in FIGS. 3 and 4 as including the substitute link base 10, the backing web 11 projecting outward from an edge of such base, and the flight plate 12 carried by the web. Such plate is bent transversely of the web and projects in cantilever fashion from the forward edge of the web in a direction transversely of the direction of movement of the conveyor chain and in a plane parallel to the conveyor chain pins.

Fish to be beheaded are moved along the beheading table 2 by the flights 12 of the block chains 4, 5 and 6, and are held down firmly for the beheading operation by hold-downs 13 shown in general in FIG. 1 and in greater detail in FIGS. 2 and 3. Such hold-downs circulate in an endless path along the lower stretch of which they are moved in synchronism with the movement of the conveyor chains 4, 5 and 6. The hold-downs are spaced apart lengthwise of their orbit at locations corresponding to the bays between the conveyor chain flights.

The construction of the mounting, drive and guide means for the hold-down mechanism is disclosed in U. S. Pat. Nos. 2,625,706 and 2,625,708, which may be referred to for structural details. In general each hold-down 13 is mounted on the end of a post 14 guided for sliding lengthwise in guides 15. The weight of such hold-downs slides the posts downward relative to their guides as the hold-downs are moved along the lower stretch of their orbit, and such posts are slid by gravity downward into their guides as the hold-downs travel along the upper stretch of the hold-down orbit. The maximum extent of hold-down descent in each direction is limited by a stop pin 16 carried by the post bottoming in one end or the other of a slot in the post guide sleeve through which such stop pin projects.

During movement of the hold-downs along the lower stretch of their orbit the guide sleeves 15 for posts 14 are held at a predetermined constant elevation by engagement with track 17. Consequently, the lower ends of the slots in the guide sleeves receiving stop pins 16 will be held at a constant level during such travel. The position of the track 17, the location of the slots in the guide sleeves 15 and the locations of the cooperating pins 16 in posts 14 will determine the limiting lower position of the hold-downs during their movement along the lower stretch of their orbit.

The mechanism for raising a small fish F from the lower broken-line position of FIG. 3 to the upper broken-line position includes a plurality, such as three, parallel rails 18 shown in FIGS. 1, 2, 3, 5 and 9, located alongside the transport chains 4, 5 and 6, respectively. These rails are supported by posts 19 shown in FIG. 3, which are lengthwise reciprocable in guide sleeves 20 to support the rails for movement between the lower solid-line position shown in FIG. 3 and the upper broken-line position.

The means for effecting such reciprocation of the posts 19 is shown in FIGS. 2 and 3 as including a roller 21 mounted on the lower end of the post 19 and engaged in the notch 22 of a horizontal, longitudinally reciprocable, rail-elevating bar 23. One side of the notch 22 is inclined rather gradually so that, as the rail-elevating bar is moved lengthwise, such inclined notch side will wedge the roller 21 upward to move post 19 and rail 18 upward correspondingly.

Lengthwise movement of the bar 23 is effected by swinging of the upright arm 24 mounted on cross shaft 25. The swinging end of such arm carries a pin 26 received in a slot 27 in the bar 23. Swinging of the arm 26 can be limited by engagement of a stop pin 28 carried by an arm on the shaft with the end of an arcuate slot 29 in which the pin is received. The shaft 25 can be rocked by swinging a handle 30 projecting radially downward from it. The shaft, arm and pin structure serves as a crank connection to slide the rail-elevating bar 23 in one direction or the other by swinging handle 30.

The beheading knife 31 is rotatably mounted on the shaft 32. The hold-downs are propelled around their orbit by drive chains 33. From the beheading station the beheaded fish are transported by the chains 4, 5 and 6 along the transfer table 34 to be dumped at its discharge end into the cleaning mechanism feed trough 35. The fish are moved along the beheading table 2 and the transfer table 34 back first, so that each fish will slide from the discharge end of the transfer table into the trough 35 back first and belly up. Each fish is then fed tail first to the bull ring of the cleaning mechanism.

At the discharge end of the trough 35 is a tail-receiver 35' formed of two cooperating concave shells movable toward and away from each other to embrace opposite sides of the tail portion of the fish. Such tail-receiver is movable elevationally in synchronism with rotation of fish tail-impaling pins on the bull ring 95 to place and to hold the tail portion of the fish in the proper relationship to the bull ring tail-impaling pins so that they can penetrate the tail portion of the fish to secure the fish to the bull ring for the cleaning operation.

Feeding mechanism for moving the fish along the trough 35 to engage their tail portions with the tail-receiver and for elevating the tail-receiver to enable the fish to be secured on the bull ring is shown in U. S. Pat. Nos. 2,525,267, 2,630,208 and 2,680,876. The mechanism of the present invention is somewhat similar to that shown in those patents, but includes improved mechanism.

To move a fish tail first along the trough 35 pusher lugs 36 carried by a chain 37 are moved along a slot in the trough toward the fish-cleaning mechanism indicated generally at 38. A variable-speed hydraulic motor 39 is connected to drive both the cleaning mechanism and the fish-beheading mechanism at a speed synchronized with the remainder of the fish-canning line in which the beheading mechanism and the cleaning mechanism are incorporated, as disclosed in U.S. Pat. No. 3,456,289. By varying the speed of such motor the fish supplied to the canning line from the beheading and cleaning apparatus of the present invention can keep pace with the remainder of the canning operation.

The drive mechanism for the fish-beheading mechanism and the fish-cleaning mechanism is shown particularly in FIGS. 5 to 11. The motor 39 drives chains 40 and 41 in sequence to turn the main drive shaft 42 for the beheading mechanism. This shaft is connected by a coupling 43 to a second shaft section 44 that is mounted directly on the beheading mechanism. Such shaft drives a cross shaft 45 extending under the beheading table, as shown in FIGS. 1 and 9, by bevel gearing 46 shown in FIG. 5.

The beheading knife shaft 32 is rotated by an upright drive shaft 47 turned by bevel gearing 48 connecting it to cross shaft 45. Such upright shaft in turn drives the beheading knife shaft 32 through bevel gearing 49. Cross shaft 45 also drives the hold-down driving chains 33 through successive chains 50 and 51. To such chain drive a further chain 53, shown in FIG. 7, is connected to drive the chains 4, 5 and 6 of the transfer table and the beheading table.

During the cleaning operation by the cleaning mechanism 38 the fish are carried on the periphery of a bull wheel 95 on which drive gears 54 are mounted. These gears are turned by pinions 55 mounted on shaft 56 as shown best in FIG. 6. This shaft is turned directly and continuously by chain 40 whenever the drive motor 39 is in operation. The speed of rotation of the bull wheel is controlled by regulating the speed of the motor 39.

Shaft 56 also powers mechanism for elevating the fish tail-receiver 35' in synchronism with rotation of the bull ring. Whenever shaft 56 is turning to drive the bull ring, it is also connected to drive the tail-receiver elevating mechanism. This latter mechanism is driven by a roller chain 57 connecting shaft 56 to a sprocket 58 mounted on a sleeve 59, as shown in FIGS. 6 and 11. Shaft 42 for driving the beheading table mechanism extends through sleeve 59 and serves as a bearing support for it.

On sleeve 59 is mounted a disk cam 60, the periphery of which is engaged by a cam follower roller 61 mounted on the end of an arm 62. This arm projects from a slide 63 transversely of the direction of its movement in an upright guide 64. The slide is urged downward by a spring 65 which maintains the cam follower roller 61 in engagement with the periphery of the cam. The fish tail-receiver 35' is mounted on slide 63 to be elevated with the slide as it is raised when the disk cam 60 is rotated to engage its lobe with the cam follower roller 61.

Floating on shaft 56, which is driven by chain 40, is a sleeve 66 on which is mounted the sprocket for driving chain 41 and a jaw-clutch part 67 which is rotatively integral with such sprocket. The other part 68 of such jaw clutch is shiftable axially along sleeve 66 toward and away from jaw-clutch part 67 to engage and disengage the clutch parts. The clutch part 68 is moved by swinging a shifter 69 about its mounting pivot 70, carried by a stationary mounting bracket 71. The shifter is moved manually by swinging handle 72.

By effecting engagement of the clutch part 68 with the clutch part 67 in different rotative relationships the relationship between the beheading mechanism and the cleaning mechanism can be established. The beheaded end of the fish will always be located in the same position transversely of the transfer table 34 irrespective of the length of the fish, as shown in FIG. 5. Consequently the fish-cleaning mechanism and the fish-beheading mechanism should be coordinated to allow more time for a short fish than for a long fish to be transferred to the fish-cleaning mechanism along trough 35.

Operation of the chain 41 controlled by the jaw clutch 67,68 effects driving of the bull ring feeder chain 37 as well as of the beheading mechanism. The rotative relationship between the clutch parts 67 and 68 can be altered in angular increments corresponding to the circumferential extent of one tooth. Since the clutch part 68 and collar 68' are connected to rotate with shaft 56 and the bull ring drive at all times whereas the clutch part 67 and the drive sprocket for chain 41 float on shaft 56, the rotative position of the bull ring impaling pins and of the tail-receiver drive cam 60 can be altered while the fish-beheading mechanisms remain stationary. With handle 72 swung to disengage clutch part 68 from clutch part 67, collar 68', rotatively connected with clutch part 68, can be turned by inserting a bar in one of its cavities to turn shaft 56, the bull ring drive and the cam disk 60 until a pair of cooperating impaling pins of the bull ring are in the desired position relative to the position of the flights on chains 4, 5 and 6 for the length of fish expected in a particular run. Handle 72 would then be swung back into position for engaging clutch part 68 with clutch part 67. The beheading mechanism and cleaning mechanism would then be set in proper timed relationship.

Automatic deenergizing means is provided for the bull ring feeder chain 37 if it is overloaded by an oversize fish. Such automatic deenergizing means, shown in FIGS. 6, 8, 10 and 11 in particular, also enables a desired relationship between the feeder chain and the cleaning mechanism to be established. These figures show the throw-out drive gear 73 mounted on and keyed to shaft 42, which meshes with a satellite gear 74. Such satellite gear is rotatively mounted on shaft 75, projecting in cantilever fashion from a carrier disk 76 at a location spaced outward from its axis. The carrier disk is mounted concentrically with shaft 42 on a sleeve 77 encircling and having bearing engagement with shaft 42 but which is not directly rotatively connected to such shaft.

A second satellite gear 78 rotatively integral with gear 74 is mounted on cantilever shaft 75. This gear meshes with another gear 79 mounted on sleeve 80, which encircles shaft 42 and has bearing engagement with it but is not rotatively connected directly to such shaft. Bevel gearing 81 rotatively connects sleeve 80 and upright shaft 82 carrying a sprocket 83 engaged by the feeder chain 37 which feeds the fish along trough 35 to the cleaning mechanism.

Rotation of gear 73 by shaft 42 in the counterclockwise direction as seen in FIG. 11, tends to move gear 74 bodily in the counterclockwise direction to displace shaft 75 rotatively and consequently tends to turn carrier disk 76 also in the counterclockwise direction. During normal operation of the apparatus the carrier disk is held against such rotation by a latching link 84 swingably mounted by a pivot pin 85 on throw-out lever 86. Such lever is mounted by pivot 87 on a supporting base 88.

The swinging end of latching link 84 carries a roller 89 engageable in a notch 90 in the periphery of the carrier disk 76. When the roller is engaged in such notch the lever 86 is in upright position, and the pressure of the carrier disk notch against the roller acting lengthwise of the latching link tends to swing the throw-out lever away from the carrier disk. Such lever is retained in upright position against the normal pressure of the carrier disk notch on the link by a compression spring 91 bearing against the lever.

As shown best in FIG. 11, the periphery of carrier disk 76 has not only one but a number of notches 90 arranged around its periphery, and these may be closely spaced, as shown in FIG. 11. Provision of a number of such notches will enable the driving relationship between the fish-beheading mechanism and the bull ring feeding means to be adjusted by small increments. As has been discussed above, selective engagements of the jaw clutch parts 67 and 68 will enable the relationship between the beheading mechanism and the cleaning mechanism to be established accurately. The peripheral notches 90 of the carrier disk 76 will enable the drive sprocket 83 for the cleaning mechanism feed chain 37 to be drivingly connected to gear 73 with the feeder chain pusher lugs 36 in virtually any position relative to the beheading mechanism.

Whatever the length of a fish, the impaling pins of the bull ring should penetrate the tail portion of the fish at a location of approximately the same selected cross section in each instance. The proper position of the tail portion of the fish for the impaling pins is determined by fitting the tail portion of the fish into the tail-receiver. In order to locate the fish properly, therefore, it should be pushed tail first into the tail-receiver until the tail portion of the fish fits snugly in it irrespective of the length of the fish.

As has been mentioned above, the fish in a particular run are generally of the same size. Consequently, the feed for the cleaning mechanism can be adjusted to accommodate to best advantage fish of the size of the particular run. Such adjustment is effected by selecting the relationship between the rotative position of the tail-receiving elevating cam disk 60 and the drive for feeder chain 37 carrying the pusher lugs 36 so that such a lug will have pushed the fish to insert its tail portion fully into the tail-receiver at the time that the bull wheel pins impale the fish and begin to carry it around the bull wheel orbit.

With the clutch parts 67 and 68 engaged the collar 68' can be turned manually by inserting the end of a bar in one of its recesses until a lug 36 on chain 37 has been moved to a position along trough 35 in which it would engage the beheaded end of the largest fish anticipated in a run to be made while the tail of such fish was located in the tail-receiver 35' in position to be impalled by bull ring tail-impaling pins.

Handle 86 will then be swung to disengage link 84 from carrier disk 76 so that chain 37 would remain stationary. Again the beheading mechanism and the cleaning mechanism would be turned by engaging a bar in a cavity of collar 68' with the clutch parts 67 and 68 in engagement until the fish-impaling pins of the bull ring were in a position just ready to engage a fish tail portion. The lever 86 would then be swung backward and the link 84 raised to engage its roller 89 in an appropriate notch 90 of the carrier disk 76. The feeder chain 37 would then be properly timed with both the beheading mechanism and the cleaning mechanism for the particular run of fish.

If a fish larger than that for which the feeder chain 37 is set should be deposited in the feed trough 35 and engaged by a lug of the feeder chain, such lug would push the fish tail portion into a bottoming position in the tail-receiver before impaling pins of the bull ring engaged the fish tail portion and picked it out of the tail-receiver. Under such conditions the effort exerted by the chain 37 attempting to push the fish farther toward the fish-cleaning mechanism could overload the drive mechanism for the feeder chain.

Overload of the feeder chain 37 causing it to slow down substantially or stop would correspondingly slow down or stop sprocket 83, upright drive shaft 82 for such sprocket, bevel gearing 81, sleeve 80 and gears 79. Since gear 73 would still be turned by shaft 42 the force tending to displace gears 74 and 78, shaft 75 and carrier disk 76 in a counterclockwise direction as seen in FIG. 11, would increase to increase the pressure of the carrier disk notch on link 84. The thrust on such link caused by the carrier disk torque would force throw-out lever 86 to the right as seen in FIG. 10 from the solid-line position into the broken-line position in opposition to the force of spring 91. As rotation of the carrier disk continued, the link 84 would be swung over center into the lower broken-line position to disengage the roller 89 from the notch 90 in which it had been seated.

Such disengagement of the link 84 from the carrier disk will remove all restraint to rotation of the carrier disk. Consequently, the torque exerted by gear 73 on gear 74 will simply move gears 74 and 78 orbitally around gears 73 and 79 with gear 78 rolling on gear 79 instead of turning it. Gear 79, bevel gears 81, shaft 82 and drive sprocket 83 for feeder chain 37 will therefore remain stationary, effectively disengaging the cleaning mechanism feed, although the fish-beheading mechanism and the fish-cleaning mechanism will continue to be driven. In such case successive fish will be discharged by the transfer table 34 into the trough 35 until the operator disengages the parts of clutch 67,68, but such fish will not be fed on into the cleaning mechanism until the jam at the trough and tail-receiver has been cleared.

As stated above, the sprocket 83, shown in FIGS. 5 and 11, drives the feeder chain 37 to shift fish along the trough 35 toward the fish-cleaning mechanism. In this way the working stretch of the feeder chain is pulled, but it is desirable to have both stretches of the chain reasonably taut. Such effect can be accomplished by mounting the idler sprocket for chain 37 at the end of its loop opposite that engaged by sprocket 83 so that it is movable toward and away from the drive sprocket. Such idler sprocket is urged away from the drive sprocket by a compression spring 92 pressing rod 93 to the right as seen in FIG. 9. This rod bears against or is connected to the bearing sleeve 94 in which the idler sprocket of chain 37 is journaled.

The fish-cleaning mechanism 38 is generally of the type shown in U. S. Pat. Nos. 1,542,196 and 3,456,287. The main component of such cleaning mechanism is the bull ring 95 on which the fish are carried past the several cleaning implements. As stated previously, the tail portion of a fish is impaled by pins reciprocating axially of the bull ring which drag the fish around the bull ring orbit tail first. During movement around such orbit the back and belly fins are cut from the beheaded fish, the belly is slit open, the sides of the fish are spread apart, the viscera are scraped out and the cavity is brushed clean.

Figure 12:
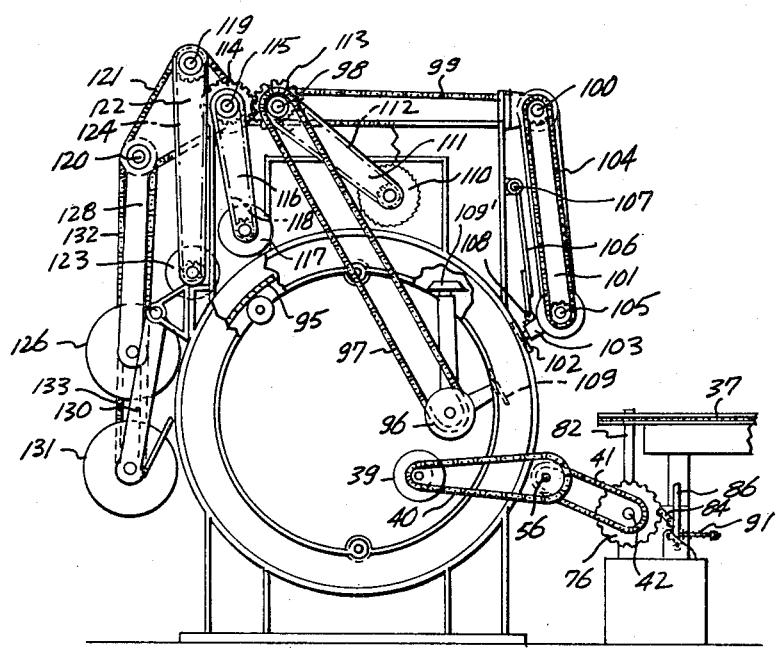
FIG. 12 is a somewhat diagrammatic side elevation of the fish-cleaning mechanism.

While the variable-speed hydraulic motor 39 rotates the bull ring of the cleaning mechanism by the gears 55 on shaft 56 engaging the bull ring gears 54, it is preferred that the various cleaning implements be powered separately by another hydraulic motor 96, shown in FIGS. 9 and 12. This motor drives the main drive chain 97 which drives the main implement drive shaft 98 extending across the top of the cleaning mechanism and over the bull ring. From the main drive shaft 98 a drive chain 99 extends forward to drive a countershaft 100. From this countershaft an elongated plate 101 is suspended to carry the belly fin cutter 102. This cutter is mounted on a cantilever swingable arm through which the belly fin cutter shaft extends and is driven by chain 104 connected to countershaft 100. The mounting plate 101 is swingable about the axis of shaft 100, and the attitude of mounting arm 103 about its pivot 105 is controlled by a control link 106 extending generally parallel to the cutter-mounting plate 101. The upper end of such link is connected by a pivot 107 to the frame of the machine, and the lower end of such link is connected by a pivot 108 to the belly fin cutter-mounting arm 103.

The belly fin cutter 102 is a circular rotary cutting disk rotated about an axis directed substantially radially of the bull wheel 95. The face of such disk will ride against the belly of a fish and the disk will be moved toward and away from the bull wheel depending upon the width of the fish. As the mounting arm 101 is swung by engagement of the cutting disk with the fish, the control link 106 will maintain the arm 103 in a substantially radial attitude so that the plane of the cutting disk is held substantially tangential to the belly of the fish whatever the fish width may be.

Figure 13:
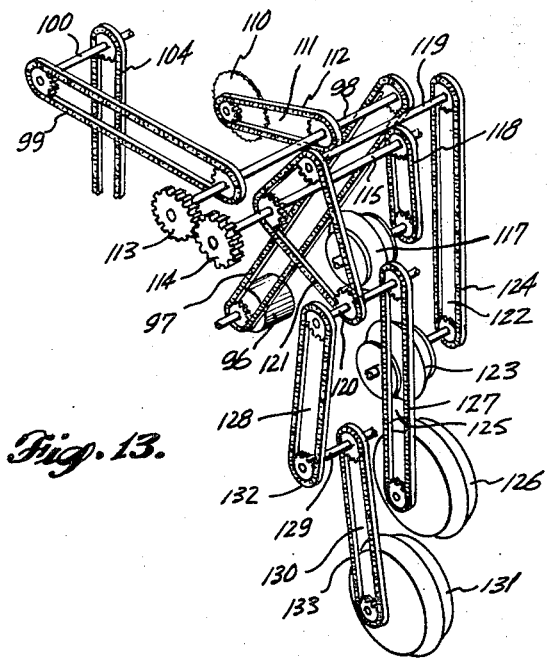
FIG. 13 is a diagrammatic top perspective of the drive mechanism for the various cleaning elements of the cleaning mechanism.

At the inner side of the bull ring substantially directly opposite the belly fin cutter is a rotary tail cutoff disk 109, which is powered rather directly by the implement drive motor 96. Spaced circumferentially from the belly fin cutter 102 around the bull ring adjacent to its inner circumference is a back and dorsal fin cutting saw 109' and adjacent to the other circumference of the bull wheel is a belly-slitting saw 110 mounted on the end of a cantilever arm 111. This saw is driven by a chain 112 connecting it to the main drive shaft 98, as shown in FIGS. 12 and 13. Slitting of the fish belly by this saw enables the sides of the fish to be spread apart to enable rotary eviscerating scrapers and cleaning brushes to enter the fish body cavity.

The end of main drive shaft 98 remote from main drive chain 97 carries a gear 113 meshing with a gear 114 on a second main drive shaft 115 to reverse the direction of shaft rotation. From such second main drive shaft an arm 116 depends, on the swinging end of which is mounted a first rotary eviscerating scraper 117. Such scraper is rotated by drive chain 118 in a direction such that the portion of its periphery contacting the fish is moving in a direction opposite to the direction in which the fish is moved by the bull ring and scrapes toward the beheaded end of the fish.

A first countershaft 119 and a second countershaft 120 are driven by a chain 121 from the second main drive shaft 115. On the lower end of an arm 122 depending from countershaft 119 is carried a second rotary eviscerating scraper 123, which is driven by chain 124. From shaft 120 an arm 125 is suspended that carries a first rotary cleaning brush 126 on its lower end, which is driven by chain 127. This cleaning brush engages the fish following the operation on it of the second eviscerating scraper 123.

An arm 128 suspended from countershaft 120 carries an auxiliary countershaft 129, from which a further support arm 130 depends. A second rotary cleaning brush 131 is carried by the lower end of arm 130 and is rotated by a chain 132 turning shaft 129, which in turn drives chain 133. This second cleaning brush completes the cleaning of the fish cavity so that after the fish has been carried past it by the bull ring 95 the fish tail-impaling pins can be withdrawn to release the fish from the bull ring.

We claim:

1. Fish-beheading and cleaning apparatus comprising fish-beheading mechanism, fish-cleaning mechanism, common drive means for said fish-beheading mechanism and for said fish-cleaning mechanism carried by and connected directly to one of such mechanisms, driven means carried by and connected to the other of such mechanisms, and jaw-clutch means connecting said drive means and said driven means and engageable in different positions to alter the timed relationship between said fish-beheading mechanism and said fish-cleaning mechanism.

2. In the apparatus defined in claim 1, transfer means for transferring to the fish-cleaning mechanism fish beheaded by the fish-beheading mechanism, and means connected to the driven means with the jaw-clutch means interposed between said connected means and the drive means for driving said transfer means.

3. In the apparatus defined in claim 2, means for altering the timed relationship between the transfer means and the driven means.

4. In the apparatus defined in claim 3, the transfer means including a drive sprocket connected to the driven means, an idler sprocket spaced from said drive sprocket, an endless loop chain encircling said sprockets and having pusher lugs for feeding fish, means supporting said idler sprocket for movement toward and away from said drive sprocket, and spring means urging said idler sprocket away from said drive sprocket to tighten said chain.

5. In fish-beheading and cleaning apparatus including fish-beheading mechanism, fish-cleaning mechanism having a fish-supporting bull ring rotated about a horizontal axis, and transfer means for transferring beheaded fish from the fish-beheading mechanism to the fish-cleaning mechanism having a tail-receiver alongside the bull ring and means supporting the tail-receiver for elevational movement, the improvement comprising a cam disk rotatable about a horizontal axis and engageable with the tail-receiver supporting means for moving it elevationally, and drive means moving in synchronism with rotation of the bull ring for effecting rotation of said cam disk.

6. In fish-beheading and cleaning apparatus including fish-beheading mechanism, fish-cleaning mechanism and transfer means for transferring beheaded fish from the fish-beheading mechanism to the fish-cleaning mechanism, drive means for said transfer means, and throw-out means operable automatically by overloading of said transfer means to disengage said drive means from said transfer means.

7. In the apparatus defined in claim 6, the transfer means including an endless chain loop and a drive sprocket for said endless chain loop, and the throw-out means being engaged between said drive sprocket and the drive means.

8. In the apparatus defined in claim 7, the throw-out means including a carrier disk, satellite gearing mounted on said carrier disk, and holding means normally preventing rotation of said carrier disk but releasable by excessive loading of the endless chain loop to enable said carrier disk to rotate and interrupt the drive of the drive sprocket.

9. In the apparatus defined in claim 8, the periphery of the carrier disk having a notch, and the holding means including a spring-pressed latching member engageable in said notch.

* * * * *